No. 892,486. PATENTED JULY 7, 1908.
A. E. WOOLF.
PROCESS FOR PURIFYING WATER AND SEWAGE.
APPLICATION FILED JAN. 11, 1908.
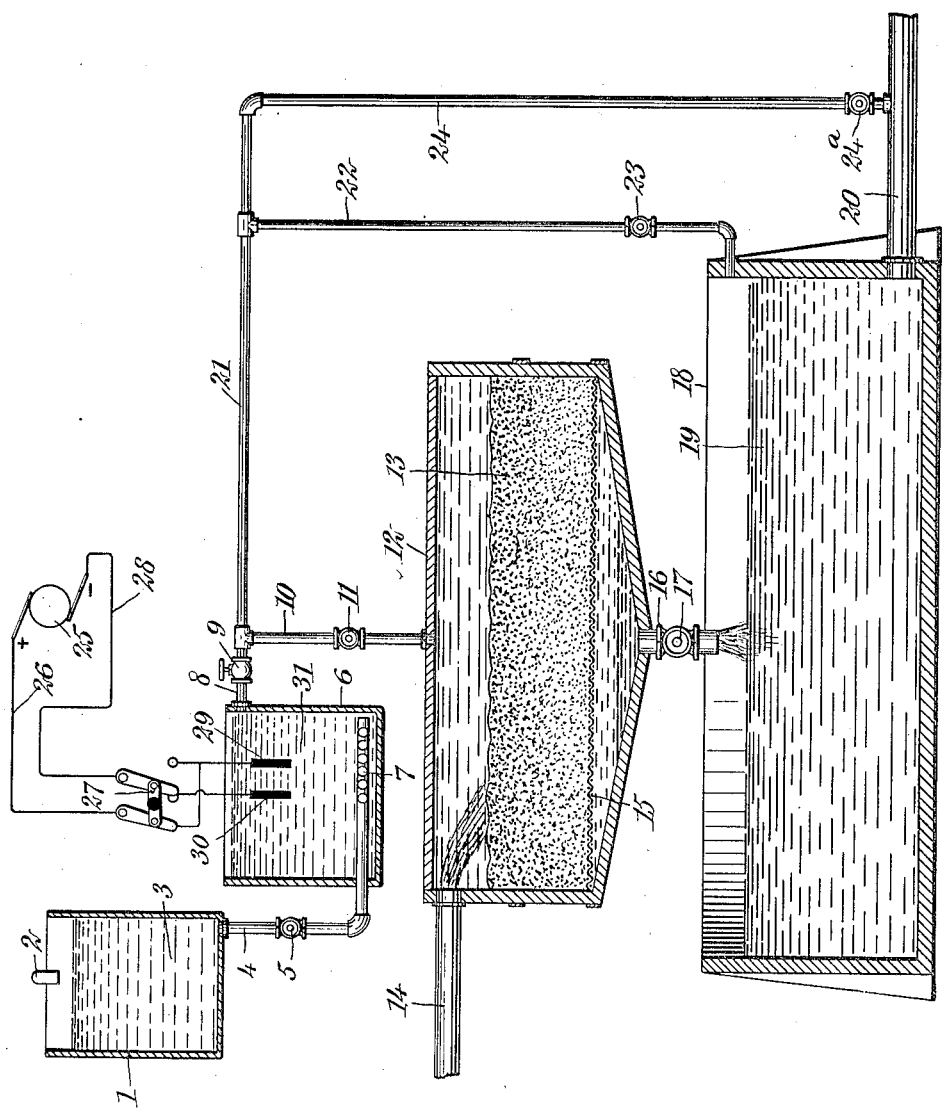
WITNESSES:
J. A. Brophy
Walton Harrison
INVENTOR
Albert E. Woolf
BY Munn & Co
ATTORNEYS

UNITED STATES PATENT OFFICE.

ALBERT EDWARD WOOLF, OF NEW YORK, N. Y.

PROCESS FOR PURIFYING WATER AND SEWAGE.

No. 892,486.  Specification of Letters Patent.  Patented July 7, 1908.

Application filed January 11, 1908. Serial No. 410,371.

*To all whom it may concern:*

Be it known that I, ALBERT EDWARD WOOLF, a citizen of the United States, and a resident of the city of New York, borough of Manhattan, in the county and State of New York, have invented a new and Improved Process for Purifying Water and Sewage, of which the following is a full, clear, and exact description.

My invention relates to the purification of water and sewage, and more particularly to the disinfection of the liquid by means of an electrolyzed saline solution. I preferably employ a saline solution as a basis, but do not limit myself to this particular application of the invention.

Reference is to be had to the accompanying drawing forming part of this specification, in which the figure represents a vertical cross section through one form of the apparatus used in connection with my improved process.

A tank 1 is employed as a receptacle to hold the solution to be electrolyzed and afterward employed as a disinfectant. An inlet pipe is shown at 2, and the tank 1 contains a volume 3 of saline solution to be acted upon. Connected with the tank 1 is a pipe 4 provided with a valve 5 and leading to a tank 6 used for electrolyzing. A multiple nozzle 7 is mounted upon the lower end of the pipe 4 for discharging liquid into the tank 6. A pipe 8 is connected with the tank 6 and is controlled by a valve 9. Connected with the pipe 8 is a pipe 10 controlled by a valve 11, and leading to another tank 12; this tank contains a filter bed 13. A pipe 14 discharges into this filter bed the water or sewage to be treated. Below the filter bed is a sieve 15 for holding the material in position. This filter bed may consist of sand or gravel, or both of the same in connection with broken rock. A pipe 16 leads downward from the tank 12 and is provided with a valve 17. Below the tank 12 is a tank 18 containing a volume of liquid 19 mainly discharged from the tank 12. An outlet pipe is shown at 20. Connected with the pipe 8 is a pipe 21, and leading downwardly from the latter is a pipe 22 provided with a valve 23. The pipe last mentioned connects with the tank 18. A pipe 24 is connected with the pipe 21 and with the outlet pipe 20 and is provided with a valve 24$^a$. A direct current generator is shown at 25, and its positive terminal is connected by a wire 26 with a pole-changing switch 27, and its negative terminal is connected with said switch by a wire 28. Electrodes 29—30 of suitable material, preferably hard carbon, are in electrical communication with the generator 25, so that by reversing the pole-changing switch 27 the direction of the current through the electrolyte is changed. The electrolyte is shown at 31.

While I have thus described one form of apparatus which may be employed in connection with my process, it will be understood that many different forms of apparatus may be employed for this purpose, and I describe this particular form merely to show in a practical way that the process can be easily performed.

In carrying out my invention I proceed as follows: I prepare within the tank 1, or fill into this tank, as the case may be, a volume of saline solution. Sea water in its natural condition is excellent for this purpose, but if sea water is not readily obtainable then I prepare from fresh water and ordinary table salt (NaCl) or rock salt, a three per cent. solution. This I next draw into the electrolyzing tank 6, the generator 25 being started up and the pole-changing switch being in the position indicated in the figure. The current passes through the liquid in such direction that the electrode 29 is the positive pole and the electrode 30 is the negative pole. A decomposition of the electrolyte now takes place; the water ($H_2O$) separates into oxygen and hydrogen, the hydrogen seeking the pole 30, the oxygen of the water seeking the pole 29. The sodium chlorid is to some extent broken up, the sodium going to the negative electrode 30, the chlorin seeking the positive electrode 29. The oxygen and chlorin, both in the form of gas, being thus brought together at the positive pole unite with each other and with some of the sodium, thus forming sodium hypochlorite ($NaClO$), which compound is constantly distributed throughout the electrolyte. For the purpose stated, the pressure current or voltage may be very low, say 4 to 6 volts, and the amperage or quantity current, of course may be commensurate with the work done, the extent of electrode surface, and many other factors of this kind. The sodium hypochlorite constantly accumulates within the electrolytic fluid 31, which may be drawn off continuously or at intervals as may be desired. It may also be used in various ways, for instance, if through the pipe 14 sewage or water to be purified is conducted into the tank 12 and passed through the filter bed 13, it may be desirable to periodically, or continuously, as the case may be, sterilize the filter bed 13. To this end the electrolytic fluid 31 may be allowed to escape through the pipe 10 and valve 11 into the tank 12. The electrolyzed saline solution containing the sodium hypochlorite, being admitted to the tank 12, works its way into the filter bed 13. Not only is the filter bed thus maintained in operative sterile condition but the polluted liquid passing through it is more or less purified or sterilized, depending upon the character of the liquid treated. Suppose, again, that it is not desired to introduce into the tank 12 any of the liquid containing the products of electrolysis, but that it is desired rather to introduce this liquid into the tank 18 after the filtration is completed or after any primary treatment, this is easily accomplished; the valve 11 is kept closed, and the valves 9 and 23 are opened. The electrolyte, containing the products of electrolysis, is now introduced directly into the tank 18 and is diffused through the liquid 19. It rapidly oxidizes any organic matter which may be present in the liquid. Suppose now, that it is desirable not to direct the disinfecting liquid into the filter bed, or into the water or sewage before the latter enters the filter bed, nor even into the water after passing through the same and while standing in a receptacle such as 18, but it is thought, rather, to introduce the disinfecting liquid continuously or intermittently as the water flows from a reservoir or receptacle 18. In this case, I open the valve 24ª and allow the disinfecting liquid to pass through the pipe 24 and into the pipe 20, as the water 19 flows outwardly through the latter. Under certain conditions this treatment would be preferable.

It may be desirable, under certain conditions, to disinfect before and after filtration. In order to keep the filter bed from becoming rapidly polluted and to prolong its life, valve 11 is opened, allowing disinfecting liquid to pass through pipe 10 into the filter bed or tank 12. The contaminated liquid above the filter bed will thus be partially sterilized before filtration. To insure complete sterilization, the disinfecting liquid is also passed through pipe 22 into the resulting effluent which may be in reservoir 18. In this case valve 24ª is kept closed. Evidently the disinfecting liquid may be passed into the effluent whether in reservoir 18 or flowing off therefrom, or flowing off in any desired manner from the filter bed.

In the instances where filtration is not desirable, or where the septic tank system or chemical precipitation is preferable, or any other system (dependent upon existing conditions) is used, the effluent drawn off is economically disinfected by the addition thereto of a small percentage of the disinfecting liquid, prepared as above described.

Heretofore an electrolyzed solution of salt water has been injected into a stream of infected water or sewage for the purpose of disinfecting and deodorizing the same, but this treatment did not go far enough to meet the requirements in many cases. In order to secure more economical and satisfactory sterilizing results I have found it necessary to subject sewage or other contaminated liquid to a primary treatment, such as filtration, action of the septic tank, or chemical precipitation to cause the suspended organic matter to be deposited or separated and then add to the resulting effluent an electrolytically produced disinfecting solution for effecting complete sterilization.

No matter how the sterilizing liquid may be employed I find it expedient to reverse the direction of the electric current. This I do at intervals, by means of the pole changing switch 27. In reversing the switch, the polarity of the electrodes is alternately changed, that is to say, with the switch 27 in the position indicated in the drawing, the electrode 29 is positive and the electrode 30 is negative. However, the switch being reversed, the electrode 30 becomes positive and the electrode 29 becomes negative. In the electrolyzing systems heretofore used, it has been found to be a great disadvantage that the negative electrode in time becomes coated by deposition due to electrolytic action, this deposition resisting the passage of the current thus causing heat and loss of energy and necessitating suspension of the work for a sufficient length of time to enable the electrode in question to be removed and cleaned. Upon this account, it has heretofore been difficult, if not impossible, to continuously operate an electrolyzing system in which sea water or its equivalent is used. However, by changing the polarity by the aid of the pole changing switch as above described, I find that the deposit upon either electrode which happens for the time being to have been last employed as a negative electrode, is easily and effectively removed during the process of electrolysis. This enables the general operation to be made continuous and economical.

In all systems of sewage treatment known to the present time the treated effluent contains more or less impurities. No system gives complete sterilization. I claim by my improved system herein described to completely sterilize the effluent and by having an excess of disinfectant or sterilizer I will discharge the effluent resulting from my process into any potable water or stream as a benefit and not a detriment, for the reason that the excess of disinfectant or sterilizer will attack any organic matter which may be in the water or stream into which the effluent may be discharged. The products resulting from my process being absolutely harmless may be added to sewage or impure water in any quantity to accomplish any purpose and with beneficial results.

Having thus described my invention, I claim as new and desire to secure by Letters Patent,—

1. The process of treating liquid to be filtered, whereby the filter bed shall be maintained in operative sterile condition, consisting in adding a small percentage of electrolytically produced disinfecting solution to said liquid prior to complete filtration.

2. The process of treating contaminated liquid to render the same aseptic, consisting in passing said liquid through a bed of filtering material maintained in operative sterile condition by the addition of a small percentage of electrolytically produced disinfecting solution prior to complete filtration and subsequently adding to the effluent a percentage of disinfecting solution to effect complete sterilization.

3. The process of treating liquid to effect sterilization, consisting in preliminarily effecting a partial sterilization, passing the incompletely sterile liquid through a filter bed, maintained in operative sterile condition through the action of electrolytically produced disinfecting solution passing therethrough, and adding to the resulting effluent an excess of the disinfecting solution to effect complete sterilization.

4. The process of treating sewage or contaminated liquid to render the same aseptic, which consists in subjecting the same to a preliminary step of purification to remove part of the impurities, and then adding to said partially purified liquid a relatively small quantity of disinfecting saline solution, which has been subjected to electrolytic action, to effect complete sterilization.

5. The process of treating sewage or contaminated liquid to render the same aseptic, which consists in subjecting it to a primary treatment to free it from suspended organic matter, and adding to the resulting effluent a small percentage of the products of an electrolyzed saline solution, for effecting complete sterilization.

6. A continuous process of treating sewage or contaminated liquid to render the same aseptic, consisting in immersing electrodes in a saline solution and electrolyzing the same, thereby producing disinfecting liquid, subjecting the body of contaminated liquid continuously to a primary treatment to free it from an excess of suspended organic matter, adding to the resulting effluent a small percentage of the electrolyzed saline solution, and at suitable intervals reversing the polarity of the electric current, whereby deposits will be removed from the electrodes and the operation of the process thus made continuous.

7. A continuous process of treating sewage or contaminated liquid to render the same aseptic, consisting in immersing electrodes of like material in a saline solution and electrolyzing the same, thereby producing disinfecting liquid, passing the contaminated liquid continuously through a filter bed maintained in operative sterile condition through the action of a small percentage of the electrolyzed saline solution passing therethrough, and at suitable intervals reversing the polarity of the electric current, whereby deposits will be removed from the electrodes and the operation of the process thus made continuous.

8. The process of continuously supplying purified water, which consists in immersing electrodes of like material in a saline solution, passing an electric current from one electrode to the other to produce electrolytically a liquid disinfectant, reversing the polarity of the current at intervals to remove deposits from the electrodes and permit of continuous operation, passing a current of contaminated liquid continuously through a filter bed and continuously introducing said liquid disinfectant into the filter bed to maintain it in an aseptic condition.

9. The process of continuously supplying purified water, which consists in immersing electrodes of like material in a saline solution, passing an electric current from one electrode to the other to produce an electrolyzed liquid disinfectant, reversing the polarity of the current at intervals to remove deposits from the electrodes and permit of continuous operation, passing a current of contaminated liquid continuously through a filter bed, continuously introducing a part of said liquid disinfectant into the filter bed to maintain it in an aseptic condition, and continuously injecting another part of said liquid disinfectant into the water after it passes from the filter bed.

In testimony whereof I have signed my name to this specification in the presence of two subscribing witnesses.

ALBERT EDWARD WOOLF.

Witnesses:
GEO. A. KEDVEICH,
SAMUEL SCHWARTZBERG.